July 2, 1940.　　　J. E. WEISSBRODT　　　2,206,015
AIRCRAFT MACHINE GUN CAMERA
Filed Sept. 14, 1937　　　5 Sheets-Sheet 1

Inventor:—
Jean Ernest Weissbrodt
By:—
B. Singer  Attorney

July 2, 1940.                J. E. WEISSBRODT                2,206,015
                         AIRCRAFT MACHINE GUN CAMERA
                    Filed Sept. 14, 1937      5 Sheets-Sheet 2

INVENTOR
Jean Ernest Weissbrodt
BY B. Singer
ATTORNEY.

Patented July 2, 1940

2,206,015

UNITED STATES PATENT OFFICE 2,206,015

AIRCRAFT MACHINE GUN CAMERA

Jean Ernest Weissbrodt, Boulogne-sur-Seine, France, assignor to Société Facin, Boulogne-sur-Seine, France, a limited-liability company Application September 14, 1937, Serial No. 163,869
In France September 14, 1936

5 Claims. (Cl. 88—16)

One of the main features of the apparatus resides in that the automatic inscription of marks or other indications upon the film is effected by means of an optical auxiliary system consisting of an objective and of mirrors or prisms placed, automatically or not automatically, at the beginning and at the end of taking views, at suitable places for intercepting the optical rays emanating from the filmed object, for example those emanating from a chronograph or another signalizing device, and for forming on the film the image of the horary dial or an indicating mark of any kind.

Another feature of the apparatus resides in the manner of registering marks and horary indications upon the film, with the aid of a retarding mechanism. In case inscriptions are to be made at the beginning of taking views, this mechanism retards the instant of displacement of the optical auxiliary system to insure passage of the optical rays emanating from the filmed object.

On the contrary, in case of inscriptions at the end of taking of views, this mechanism retards the instant of stoppage of the general movement of the apparatus and moves simultaneously the optical auxiliary system into working position.

A further feature of the apparatus consists in the provision of a charger comprising a curved duct specially devised to provide the required space for the outlined auxiliary optical device.

Other features will be brought forward in course of the following description relating to the drawings appended. In the drawings.

Figure 1:
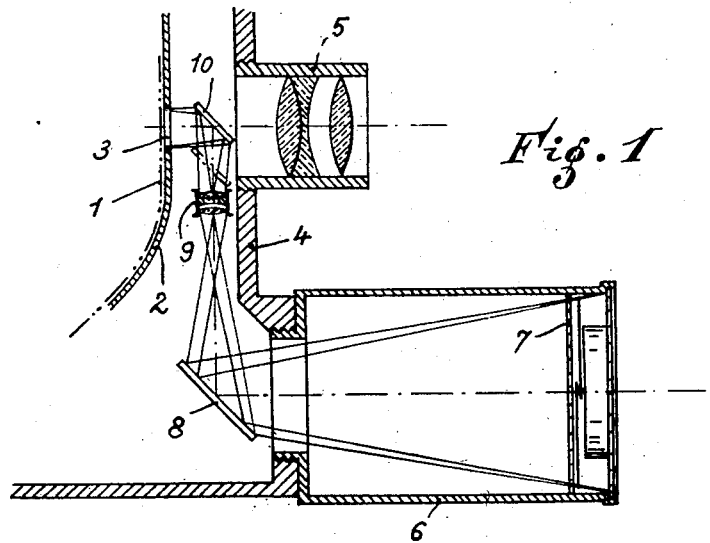
Figs. 1 and 2 are two views in section illustrating the principle of the optical device of the apparatus.

A film 1 (Fig. 1), guided by a curved wall of a magazine 2, passes in front of a window 3 cut out in the wall in conformity with the shape of the image.

On the front wall of the camera 4, carrying the normal objective 5 for taking views, is situated, in a chamber 6, the device 7 comprising the mark indications, the details whereof should appear on the film at an appropriate instant.

This device 7 can be, for example, a chronograph, its dial and support being of glass.

A mirror 8 fixed at 45° deflects the chronograph image to an auxiliary objective 9, and the rays emanating from the latter fall upon a second mirror or prism 10 which is movable and which, in normal position, is removed so as to permit the passage of the rays passing through the objective 5 to strike the film 1.

Figure 2:
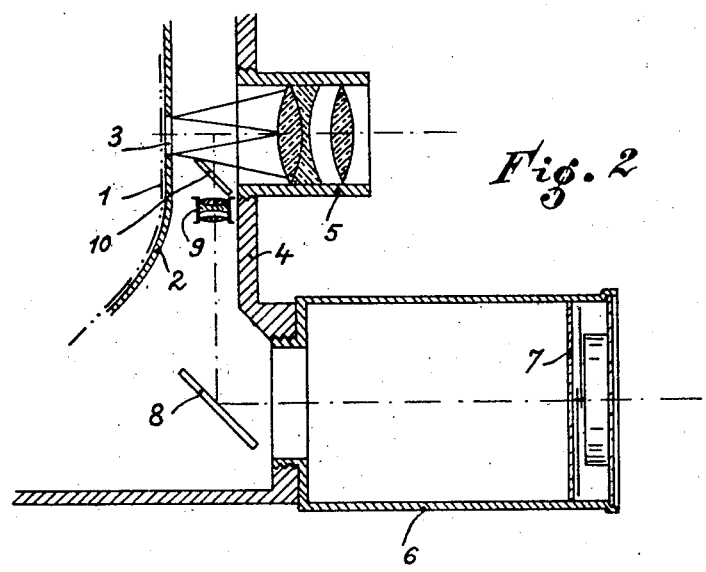

As will be easily perceived from Fig. 2, the mirror or prism 10 reflects in this position the rays from the mirror 8 upon the wall of the magazine 2 whereas in the position of Fig. 1 it reflects these rays upon the film through the window 3, and intercepts simultaneously those emanating from the objective 5 for taking views. Consequently it is possible by displacing the mirror 10, to make the indication furnished by the device 7 appear, at any suitable moment, on the film 1.

One suitable embodiment of the cinematographic camera based on the outlined principle is represented in Figs. 3 to 6.

On the front wall of the camera 4 (Fig. 3) are fitted the objective 5 and the chamber 6 containing the chronograph. The prism or mirror 8 is placed in the camera, opposite the dial of the chronograph and reflects upon the objective 9 the rays emanating from its transparent dial lighted through a rear window 11 or by reflection or by natural or artificial light.

Figure 3:
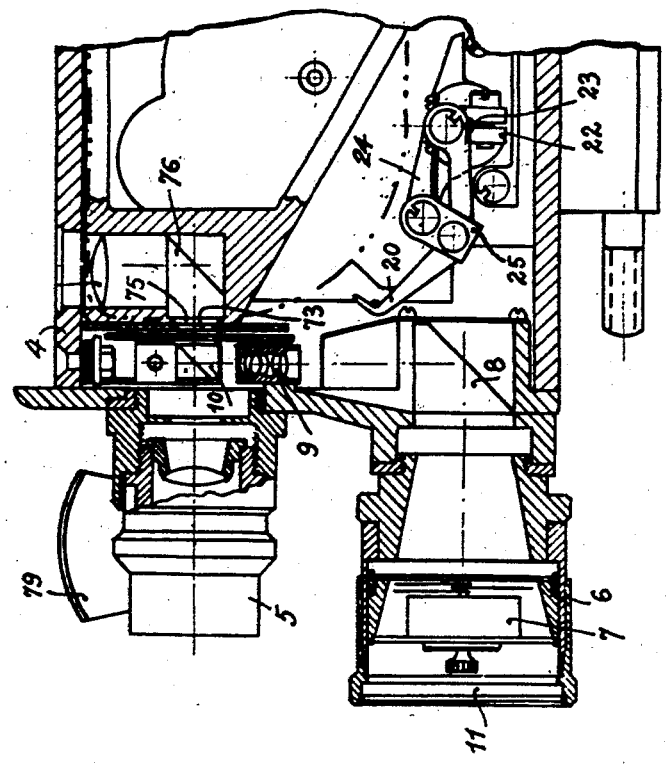
Fig. 3 is a view of a portion of the apparatus, in longitudinal section passing through the magazine.
Figure 4:
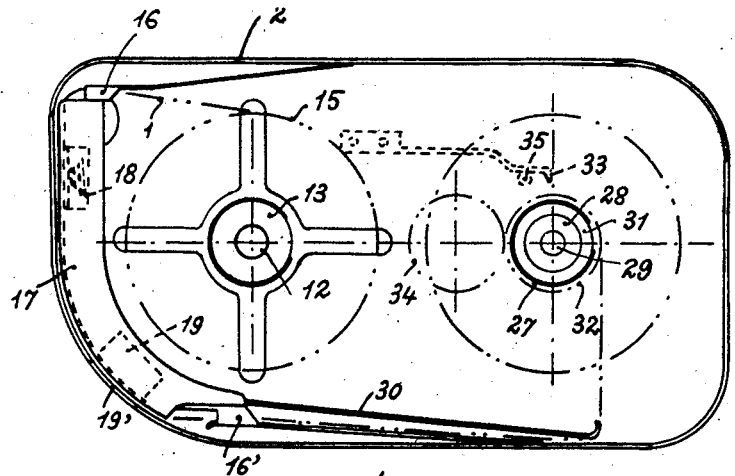
Fig. 4 is a side view of the magazine itself.

The film to be impressed is placed in a magazine 2 shown in dot and dash line in Fig. 3 and, for sake of clearness, separately represented in Fig. 4.

In the casing of the magazine 2 is fixed an axle 12 carrying a hub 13.

The film delivery roller 15 is placed on the hub 13 and the film 1 passes below a guide 16, and engages a duct 17 disposed in the magazine 2 and provided with borders guiding, laterally, the film.

The film passes in front of the window 3 and is subjected there to a pressure exerted by a pressing member 18.

Below this window the duct 17 is curved and provided with two or more lateral recesses 19 provided opposite the window, or windows, 19' cut out in the magazine 2, these recesses and windows being destined to give passage to the driving claw, or claws, 20 (Fig. 3).

On leaving the duct 17 (Fig. 4), the film passes below a guide with ears 16' and then below a beater 30, whereupon it is wound on a receiver drum 31, where it is kept by a ring 27.

The drum 31 is driven by the hub 28 which engages the drum by friction and is integral with the shaft 29.

At the extremity of the shaft 29, and outwardly with regard to the charger is keyed a pinion 32.

A pawl 33 acted upon by a spring arrests the pinion 32 when out of engagement with the driving pinion 34 of the camera and prevents in this way the unwinding of the film. The beak of the pawl enters into the space between two teeth of the pinion 32 previous to the total disengagement having been produced by the withdrawal of the magazine. At the instant of the engagement of the pinions 32 and 34 the said beak is raised by a projection 35 fixed to the inner wall of the camera.

The module of the pinions 32 and 34 is as great as possible in order to facilitate their mutual engagement and the right working of the pawl 33.

The claw 20 (Fig. 3) is controlled by a crank 22 keyed to a shaft 23 carried by the driving mechanism of the camera, and is maintained on a movable platen 24 through the medium of an auxiliary crank 25. The purpose of the movable platen 24 is to produce the withdrawal of the claw 20 when its beak is not opposite a notch of the film at the moment of setting of the magazine.

The mirror or prism 10 is carried by a support 36 (Fig. 6) itself carried by two guides 37 and 38 and provided with a finger 39 engaging a slot 40 of a controlling lever 41.

This lever 41 pivots on an axis of shaft 42 (Fig. 5) traversing the bearings 42' and 42" of the apparatus. This shaft is constantly pushed toward the front of the apparatus by a spring 51 abutting against the bearing 42" mentioned above.

The lever 41 is provided with a nose 41' which engages a screw 43 either from above or from below, the screw 43 (Fig. 7) having squared thread and being fixedly connected to a control shaft 44. The latter is connected by a worm 44' (Fig. 5), another screw 44" and toothed pinions 83, 81 and 84 with the large gear 63 of the spring motor 67 of the apparatus.

The nose 41' is normally engaged in the thread of the screw 43 and is held against the end part 43' of said thread preventing in this way the screw from rotating and consequently stopping the whole apparatus.

Due to this fact, the screw 43 is called upon to play a triple role, i. e.:—it must serve as a stop means for the apparatus in cooperation with the lever 41; it must synchronize the positioning of the prism 10 relatively to the film with the time at which the window 3 is covered up through the obturator 54; finally, it must determine the time during which the prisms 10 are placed in front of the film.

Figure 6:
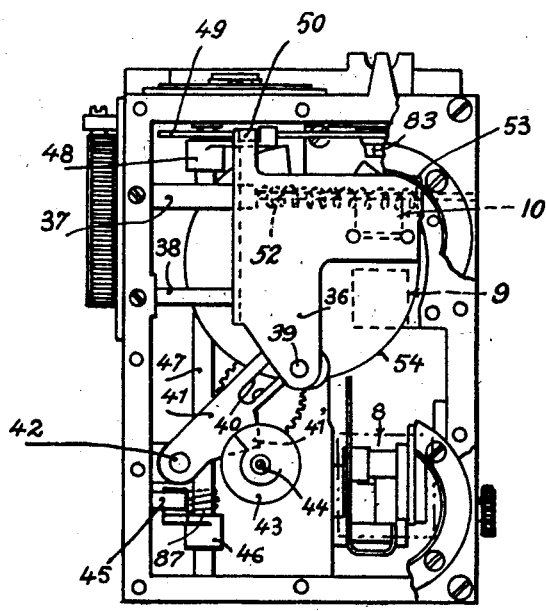
Fig. 6 a transverse section passing through the mechanism for the horary inscription.
Figure 5:
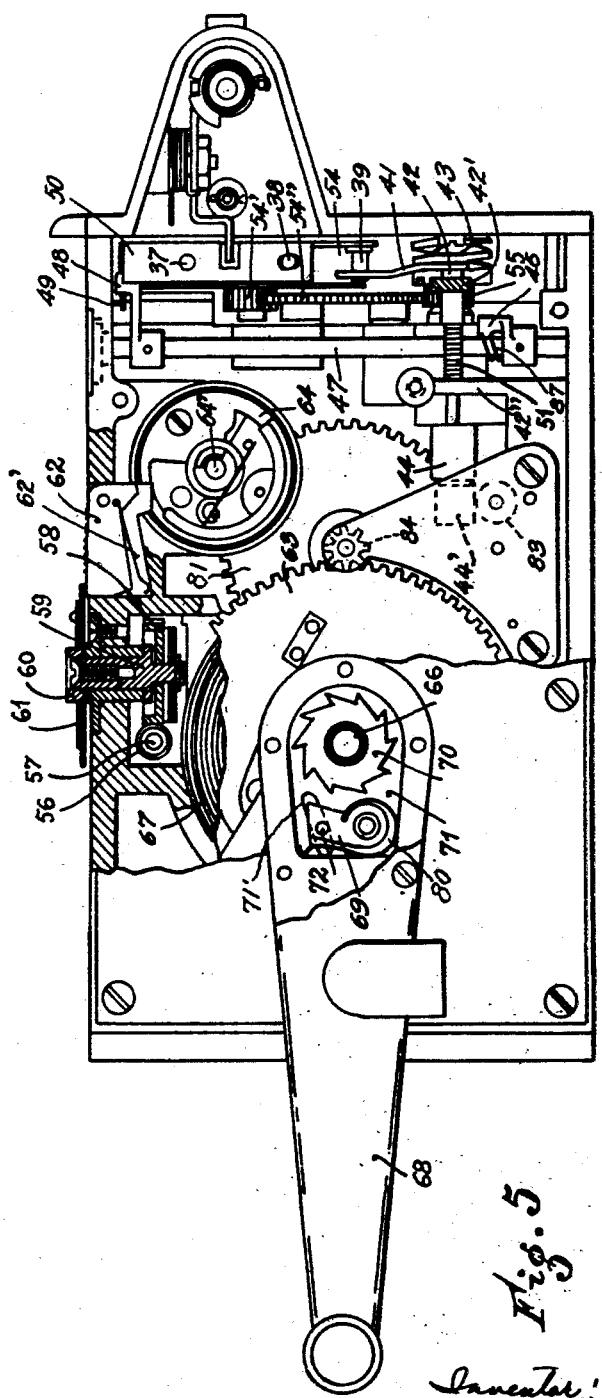
Fig. 5 is a view of the apparatus looking at the side of the mechanism, partially in section in order to show this mechanism.
Figure 7:
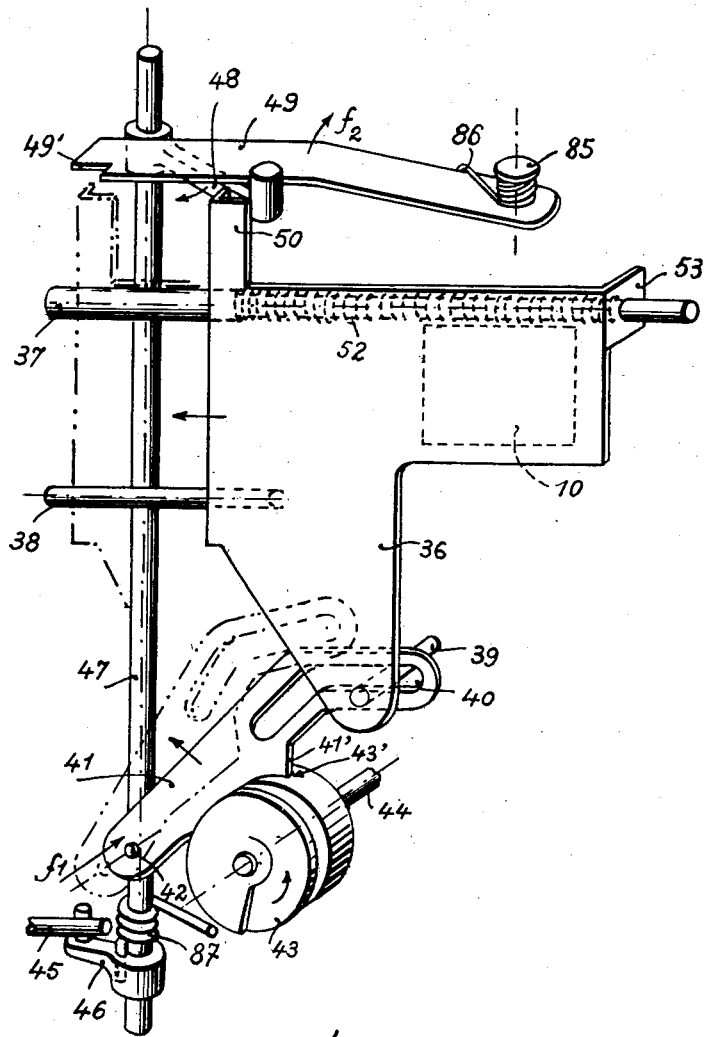
Fig. 7 is a perspective view of the synchronizing device.

These operations are fulfilled by means of the following mechanism:

On a vertical shaft 47 there are placed two cranks 46 and 48 (Figs. 5 to 7). A spring 87 brings the said shaft back to a starting position. On the lever 46, a finger 45 acts, controlled either directly by hand by the operator, or at a distance by some suitable device (not shown).

The crank 48 is made to act on the prism carrier 36 and on a ratchet pawl 49, which pivots about an axis 85, and which is urged by a spring 86 toward the front of the apparatus.

When the crank 46 is actuated (Fig. 7) by means of the finger 45, a rotation of the shaft 47 is caused and, consequently rotation of the crank 48, which acts on a lug 50 positioned on the bracket 36 in order to cause the latter to slide on two guide bars 37 and 38. The bracket 36 is, therefore, displaced toward the left hand of the figure and at the end of its stroke, this lug 50 enters into the notch 49' of the pawl which holds it immovable in this position in the manner of the safety guard on a gun.

Simultaneously, the bracket 36 acts by means of its pin 39 on the slot 40 of the lever 41, which then pivots with its shaft 42.

This being so, the nose 41' of the lever 41 is disengaged from the thread of the screw 43, which then may rotate together with the whole apparatus. The taking of pictures may then be effected normally on the film through the objective 5, since the prism 10 is held out of the optical axis of the latter.

As soon as it is disengaged from the screw 43, the lever is pushed axially with its shaft by means of the spring 51 and arrives in opposition to the end of the screw 43, while still out of engagement with its screw thread, since it is maintained in this way by the bracket 36. The pin 39 is long enough to permit the sliding movement of the lever 41 along the same.

When the operation of taking the pictures has ended, the operator ceases to act on the control member 45 and the crank 46 is, therefore, released. Under the effect of the return spring 87, the shaft 47 returns to its starting position and the crank 48 is separated from the lug 50 of the bracket 36, so that the ratchet pawl 49 continues to hold the bracket in its position of obturation.

At the end of this movement, the crank 48 may strike the pawl 49 and cause it to pivot according to the arrow $f_2$ (Fig. 7). The pawl is disengaged from the lug 50 and the bracket 36, constrained by a return spring 52, which acts on a shoulder 53 of the bracket, is placed very rapidly in the optical axis of the objective 5.

This device avoids too slow a return of the prism 10 on the said optical axis which might be brought about by the operator gradually or slowly releasing the control member 45. This slow return would have the result of producing blurs in one or several pictures of the film.

The device, therefore, permits of an always rapid return of the prism carrier 36 since this return is effected in all circumstances by the return spring 52.

On the other hand, it is necessary that the return of the prism 10 into the axis of the window for taking the pictures be effected during the obstruction of the window by the shutter 54. The latter is actuated by a pinion 54' engaging with a pinion 54" in mesh with a pinion 55 keyed on the shaft 44, which carries the screw 43.

This synchronism is easily obtained by means of the relay screw 43, since it is the shaft of the latter which controls the shutter.

To this end, the slot 40 of the lever 41 comprises an oblique part and a horizontal part in which is engaged the pin 39 of the bracket 36.

When the pawl 49 frees the said bracket, the latter actuates in its movement the lever 41 due to the pin 39.

Now, upon this movement, the nose 41' may either engage in the groove or remain at the top of the thread of the screw 43, depending on the position of the latter at the instant of the engagement.

If the nose 41' drops in the groove of the thread, the lever 41 may complete its pivotal movement and the pin 39 of the bracket 36 may engage right away the horizontal part of the slot 40, and the bracket will then come into position opposite the window of the camera.

If on the contrary the nose 41' drops on top of the thread of the screw 43, the lever 41 cannot pivot and the oblique part of the slot 40 retains the pin 39 which cannot yet reach the horizontal part of said slot. The bracket 36 can, therefore, not be placed in front of the window of the camera. This movement can be effected only when the nose 41', having engaged the top of the helical rib on the screw and the screw continues to rotate, enters the groove of the thread when the groove presents itself to the lever.

At this moment, the latter drops rapidly into the thread and the prism carrier 36, again released, is placed under the effect of its spring 52 which completes its action ahead of the film part to be exposed.

The return of the prism 10 ahead of the film takes place, therefore, during the said obstruction without any blur showing in the picture.

The screw 43 continuing to rotate actuates thereby the nose 41' which is displaced longitudinally in the direction of the arrow $f_1$ (Fig. 7) in the opposite direction of the action of its spring 52. When the nose reaches the end 43' of the thread, it prevents the screw from rotating and consequently stops the entire apparatus.

During rotation of the screw, the shutter 54 has uncovered the film a certain number of times permitting in this way printing of the chronograph image reflected by the prisms 8 and 10, and placed in position by the objective 9. The number of pictures taken of the chronograph, therefore, depends upon the length of the screw thread 43. In practice, one picture suffices.

The instant when the nose 41' reaches the end 43' of the thread of the screw must correspond also to the instant at which the shutter is closed if the camera is to be locked without possibility of blurring any picture on the film.

As soon as the operator actuates again the control member 45, the bracket 36 will be removed as mentioned above and the camera can operate only when the nose 41' is completely disengaged from the thread of the screw 43. The movement of the prism carrier will then have been sufficient to uncover completely the exposure window and the first picture following that of the hour registration may be the picture of the subject to be photographed.

The speed of taking exposures may be regulated by means of the speed controller 64 (Fig. 5) whose shaft 64' is actuated by the pinion 81.

The apparatus is completed by an automatic footage indicator made as follows:

On a shaft 57 driven directly by a pinion, not shown, and meshing with the spur gear 63, there is keyed a worm 56 actuating a wheel 58. The latter is frictionally mounted on a shaft 59 carrying a disc 60 which controls frictionally a second divided screw 61. This latter disc is displaceable with regard to the first one so as to permit adjustment of a graduation corresponding to the chosen length in such manner that an index 62 is raised when this length is surpassed. On introduction of another magazine the index is lowered and the counter brought back into nought position. All controlling shafts: the claw shaft 23, the shaft 44 controlling the device for horary inscription, and the shaft 57 of the length counter are controlled by a tooth-wheel 63 also actuating the variable speed regulator 64. The wheel 63 is moved through the medium of a pawl engagement fitted on the axle 66 of a driving spring 67, said axle serving for winding up the spring.

The rewinding of this spring is effected by means of a lever 68 acting through a pawl 69 on a ratchet wheel 70 fixed to the main holding shaft 66 of the spring. A fixed part 71 is provided with a biased slot 71' in which is inserted a pin 72 carried by the pawl 69. The slot 71' has a slant to lift the pawl from the ratchet 70 when the lever 68 is maintained horizontal by the spring clip 80, and vice versa to let the pawl engage the ratchet when the lever is raised to a vertical position. In this way, upon imparting oscillating movement to the lever, the pawl 69 actuates the ratchet wheel 70, and the spring being held from running down by the pawl 65 is thereby tensioned after a few of these oscillations.

After tensioning the spring, the lever is left in its horizontal position and the pawl 69 is raised by the slant 71', thereby letting the spring 67 act freely on the toothed wheel 63.

Before the exposure window of the camera is fixed a cross-hair 73 (Fig. 3) the image of which is reproduced in all views of the film and which materializes the optical axis of the apparatus.

In order to ensure coincidence between the firing line of the gun collimator and the optical axis of the apparatus, use is made of an eye piece fitted on a frame 74 which can occupy the place of the magazine in the apparatus.

This eye piece is constituted by a ground glass 75 on which the image of the view transmitted by the objective 5 and that of the cross-hair is established. This image is reflected by a prism or mirror 76 and can be enlarged by an enlarging system 77. The apparatus is directed in such manner that the image but coincides with the center of the cross-hair.

At its front, a wing 79 is provided, which can be lowered in front of the objective so as to protect it against dust, this wing being swung out of the way when the instrument is to be used.

What I claim is:

1. In an aircraft machine gun camera, the combination with the camera having an exposure window, a chronograph located in a box fixed to the camera, a primary prism and an auxiliary lens cooperatively positioned to project the image of the chronograph upon a second movable prism mounted for projecting the said image upon the film in the camera, a bracket for the said movable prism, guide posts on which said bracket slides to shift the prism out of the way or move it in front of the exposure window of the camera, an upper crank acting on said bracket and moved indirectly by the operator for effecting the movement of the prism to a position out of the way, a return spring adapted to act when the operator ceases to control said crank for positioning the prism in front of the window, a shaft to which said crank is keyed, another lower crank keyed to said shaft and actuated by the operator, and a spring returning said shaft to its rest position.

2. In an aircraft machine gun camera, the combination with the camera having an exposure window, a chronograph located in a box fixed to the camera, a primary prism and an auxiliary lens cooperatively positioned to project the image of the chronograph upon a second movable prism mounted for projecting the said image upon the film in the camera, a bracket for the said movable prism, guide posts on which said bracket slides to shift the prism out of the way or move it in front of the exposure window of the camera, an upper crank acting on said bracket and moved indirectly by the operator for effecting the movement of the prism to a position out of the way, a return spring adapted to act when the operator ceases to control said crank for positioning the prism in front of the window, a shaft to which said crank is keyed, another lower crank keyed to said shaft and actuated by the operator, and a spring returning said shaft to its rest position, a pawl for blocking the bracket when it is at the end of its movement for bringing the prism away from the window, said crank serving to release said pawl when the crank is completely released by the operator, by virtue of which said bracket is freed at that instant solely and said spring may rapidly move the prism in front of the exposure window regardless of a relatively slow movement of the crank.

3. In an aircraft machine gun camera, the combination with the camera having an exposure window, a chronograph located in a box fixed to the camera, a primary prism and an auxiliary lens cooperatively positioned to project the image of the chronograph upon a second movable prism mounted for projecting the said image upon the film in the camera, a bracket for the said movable prism, guide posts on which said bracket slides to shift the prism out of the way or move it in front of the exposure window of the camera, an upper crank acting on said bracket and moved indirectly by the operator for effecting the movement of the prism to a position out of the way, a return spring adapted to act when the operator ceases to control said crank for positioning the prism in front of the window, a shaft to which said crank is keyed, another lower crank keyed to said shaft and actuated by the operator, and a spring returning said shaft to its rest position, a pawl for blocking the bracket when it is at the end of its movement for bringing the prism away from the window, said crank serving to release said pawl when the crank is completely released by the operator, by virtue of which said bracket is freed at that instant solely and said spring may rapidly move the prism in front of the exposure window regardless of a relatively slow movement of the crank, a lever mounted on a shaft supported for sliding movement from the rear portion toward the front of the camera under the action of a spring, said lever having a slot comprised of a horizontal portion and an inclined portion, a pin on said bracket engaging in said slot, a relay screw having a square thread, a shaft on which said screw is keyed, said shaft being actuated by the mechanism of the camera, a nose provided on said lever for engaging the thread of said relay screw upon the bracket being positioned in front of the window, said nose being adapted to abut the end portion of the said thread to prevent the screw from turning and thereby also prevent the camera from operating, the movement of the prism's bracket to place the prism away from the window being induced by the upper crank, causing the bracket's pin to act on the slot of the lever and to separate the nose of the lever from the thread of the screw thereby permitting the screw to turn and the camera to operate.

4. In an aircraft machine gun camera, the combination with the camera having an exposure window, a chronograph located in a box fixed to the camera, a primary prism and an auxiliary lens cooperatively positioned to project the image of the chronograph upon a second movable prism mounted for projecting the said image upon the film in the camera, a bracket for the said movable prism, guide posts on which said bracket slides to shift the prism out of the way or move it in front of the exposure window of the camera, an upper crank acting on said bracket and moved indirectly by the operator for effecting the movement of the prism to a position out of the way, a return spring adapted to act when the operator ceases to control said crank for positioning the prism in front of the window, a shaft to which said crank is keyed, another lower crank keyed to said shaft and actuated by the operator, and a spring returning said shaft to its rest position, a pawl for blocking the bracket when it is at the end of its movement for bringing the prism away from the window, said crank serving to release said pawl when the crank is completely released by the operator, by virtue of which said bracket is freed at that instant solely and said spring may rapidly move the prism in front of the exposure window regardless of a relatively slow movement of the crank, a lever mounted on a shaft supported for sliding movement from the rear portion toward the front of the camera under the action of a spring, said lever having a slot comprised of a horizontal portion and an inclined portion, a pin on said bracket engaging in said slot, a relay screw having a square thread, a shaft on which said screw is keyed, said shaft being actuated by the mechanism of the camera, a nose provided on said lever for engaging the thread of said relay screw upon the bracket being positioned in front of the window, said nose being adapted to abut the end portion of the said thread to prevent the screw from turning and thereby also prevent the camera from operating, the movement of the prism's bracket to place the prism away from the window being induced by the upper crank, causing the bracket's pin to act on the slot of the lever and to separate the nose of the lever from the thread of the screw thereby permitting the screw to turn and the camera to operate, the nose of the lever being disposed with respect to the two parts of the slot of said lever in a manner such that upon the nose engaging the top of the helical loop of the screw thread it causes the pin of the bracket to remain in the inclined portion of said slot, thereby preventing the bracket from reaching a position in opposition to the window, the arrangement being such that the pin cannot pass into the horizontal part of the slot and the bracket cannot reach a position opposite the window except when the nose of the lever drops into the helical groove of the screw thread, so that synchronism is established between the positioning movement of the bracket and the obstruction of the window by the shutter of the camera.

5. In an aircraft machine gun camera, the combination with the camera having an exposure window, a chronograph located in a box fixed to the camera, a primary prism and an auxiliary lens cooperatively positioned to project the image of the chronograph upon a second movable prism mounted for projecting the said image upon the film in the camera, a bracket for the said movable prism, guide posts on which said bracket slides to shift the prism out of the way or move it in front of the exposure window of the camera, an upper crank acting on said bracket and moved indirectly by the operator for effecting the movement of the prism to a position out of the way, a return spring adapted to act when the operator ceases to control said crank for positioning the prism in front of the window, a shaft to which said crank is keyed, another lower crank keyed to said shaft and actuated by the operator, and a spring returning said shaft to its rest position, a pawl for blocking the bracket when it is at the end of its movement for bringing the prism away from the window, said crank serving to release said pawl when the crank is completely released by the operator, by virtue of which said bracket is freed at that instant solely and said spring may rapidly move the prism in front of the exposure window regardless of a relatively slow movement of the crank, a lever mounted on a shaft supported for sliding movement from the rear portion toward the front of the camera under the action of a spring, said lever having a slot comprised of a horizontal portion and an inclined portion, a pin on said bracket engaging in said slot, a relay screw having a square thread, a shaft on which said screw is keyed, said shaft being actuated by the mechanism of the camera, a nose provided on said lever for engaging the thread of said relay screw upon the bracket being positioned in front of the window, said nose being adapted to abut the end portion of the said thread to prevent the screw from turning and thereby also prevent the camera from operating, the movement of the prism's bracket to place the prism away from the window being induced by the upper crank, causing the bracket's pin to act on the slot of the lever and to separate the nose of the lever from the thread of the screw thereby permitting the screw to turn and the camera to operate, the nose of the lever being disposed with respect to the two parts of the slot of said lever in a manner such that upon the nose engaging the top of the helical loop of the screw thread it causes the pin of the bracket to remain in the inclined portion of said slot, thereby preventing the bracket from reaching a position in opposition to the window, the arrangement being such that the pin cannot pass into the horizontal part of the slot and the bracket cannot reach a position opposite the window except when the nose of the lever drops into the helical groove of the screw thread, so that synchronism is established between the positioning movement of the bracket and the obstruction of the window by the shutter of the camera, a screw for limiting the displacement of the shaft of the lever towards the front and to determine selectively the instant at which the nose of the lever may drop into the helical groove of the screw thread, said instant being identical with the instant at which the obstruction of the exposure window is effected by the shutter of the camera, the length of the screw thread being such that the time during which the nose engages said screw thread upon release of the bracket serves to enable the nose to travel over the entire length of the screw thread to the abutment at the very end, the time for this travel corresponding to the time required for recording on the film a predetermined number of pictures of the chronograph, the lever being maintained in the screw thread by a prism-supported bracket and being carried towards the rear end of the screw thus delaying the stoppage of the mechanism of the camera from the aforesaid time when the operator has released the control crank.

JEAN ERNEST WEISSBRODT.